United States Patent
Kohiyama

(10) Patent No.: US 10,103,884 B2
(45) Date of Patent: Oct. 16, 2018

(54) INFORMATION PROCESSING DEVICE AND INFORMATION PROCESSING METHOD

(71) Applicant: FUJITSU LIMITED, Kawasaki-shi, Kanagawa (JP)

(72) Inventor: Kiyoshi Kohiyama, Toshima (JP)

(73) Assignee: FUJITSU LIMITED, Kawasaki (JP)

( * ) Notice: Subject to any disclaimer, the term of this patent is extended or adjusted under 35 U.S.C. 154(b) by 199 days.

(21) Appl. No.: 15/084,417

(22) Filed: Mar. 29, 2016

(65) Prior Publication Data
US 2016/0211977 A1 Jul. 21, 2016

Related U.S. Application Data

(63) Continuation of application No. PCT/JP2013/076604, filed on Sep. 30, 2013.

(51) Int. Cl.
*G06F 21/00* (2013.01)
*H04L 29/06* (2006.01)
(Continued)

(52) U.S. Cl.
CPC .............. *H04L 9/30* (2013.01); *G06F 21/123* (2013.01); *G06F 21/72* (2013.01); *G09C 1/00* (2013.01);
(Continued)

(58) Field of Classification Search
CPC ......... H04L 9/30; H04L 9/0869; H04L 9/083; H04L 9/3226; H04L 9/0825;
(Continued)

(56) References Cited

U.S. PATENT DOCUMENTS

2003/0005321 A1* 1/2003 Fujioka .................. G06F 7/38
  713/193
2008/0253563 A1   10/2008 Chang
(Continued)

FOREIGN PATENT DOCUMENTS

JP     10-301892     11/1998
JP     2003-099329    4/2003
(Continued)

OTHER PUBLICATIONS

JPOA—Office Action of Japanese Patent Application No. 2015-538813 dated Nov. 1, 2016, with English translation of the Office Action.
(Continued)

*Primary Examiner* — Lisa C Lewis
(74) *Attorney, Agent, or Firm* — Fujitsu Patent Center

(57) ABSTRACT

An information processing device includes a first processor, an information protection circuit, and a first communication path which connects between the information protection circuit and the first processor. The information protection circuit includes an interface circuit which connects the information protection circuit to the first communication path, a second processor, and a first memory which is inaccessible from the first processor but accessible from the second processor. When a command received from the first communication path is a command destined for the information protection circuit, the interface circuit passes the command to the second processor and the second processor executes a process related to information stored in the first memory in accordance with the command, but when the command received from the first communication path is not a command destined for the information protection circuit, the interface circuit does not pass the command to the second processor.

16 Claims, 7 Drawing Sheets

(51) Int. Cl.
  *H04L 9/30* (2006.01)
  *G09C 1/00* (2006.01)
  *H04L 9/08* (2006.01)
  *H04L 9/32* (2006.01)
  *G06F 21/72* (2013.01)
  *G06F 21/12* (2013.01)

(52) U.S. Cl.
  CPC ............ *H04L 9/083* (2013.01); *H04L 9/0825* (2013.01); *H04L 9/0869* (2013.01); *H04L 9/3226* (2013.01); *G06F 2221/0786* (2013.01); *G06F 2221/0797* (2013.01)

(58) Field of Classification Search
  CPC .................. G06F 21/123; G06F 21/72; G06F 2221/0797; G06F 2221/0786; G09C 1/00
  See application file for complete search history.

(56) References Cited

U.S. PATENT DOCUMENTS

2008/0270796 A1   10/2008   Suu et al.
2010/0064143 A1    3/2010   Ohkubo

FOREIGN PATENT DOCUMENTS

| JP | 2007-281813 | 10/2007 |
| JP | 2008-263577 | 10/2008 |
| JP | 2008-269088 | 11/2008 |
| JP | 2010-067089 |  3/2010 |

OTHER PUBLICATIONS

International Search Report, mailed in connection with PCT/JP2013/076604 and dated Jan. 7, 2014 (8 pages).

* cited by examiner

FIG. 7

```
1: Read WRITE CONTENTS STORED AT MEMORY LOCATION 31
   TO MEMORY LOCATION 2001
2: Read WRITE CONTENTS STORED AT MEMORY LOCATION 32
   TO MEMORY LOCATION 2002
3: Read WRITE CONTENTS STORED AT MEMORY LOCATION 33
   TO MEMORY LOCATION 2003
4: Read WRITE CONTENTS STORED AT MEMORY LOCATION 34
   TO MEMORY LOCATION 2004
5: Read WRITE CONTENTS STORED AT MEMORY LOCATION 35
   TO MEMORY LOCATION 2005
6: ADD TOGETHER CONTENTS STORED AT LOCATION 2001,
   CONTENTS STORED AT LOCATION 2002,
   CONTENTS STORED AT LOCATION 2003,
   CONTENTS STORED AT LOCATION 2004,
   AND CONTENTS STORED AT LOCATION 2005
7: WRITE THE RESULT OF ADDITION TO LOCATION 2012
8: ADD 50 TO CONTENTS STORED AT LOCATION 2012
   AND MULTIPLY THE RESULT BY 7
9: SEND CONTENTS STORED AT LOCATION 2012
   TO INFORMATION PROTECTION UNIT
```

700

INFORMATION PROCESSING DEVICE AND INFORMATION PROCESSING METHOD

CROSS-REFERENCE TO RELATED APPLICATION

This application is a continuation application of International Application PCT/JP2013/076604, filed on Sep. 30, 2013 and designated the U.S., the entire contents of which are incorporated herein by reference.

FIELD

The embodiments discussed herein are related to an information processing device and an information processing method that prevents leakage or illegal alteration of information.

BACKGROUND

Recent years have seen the development of an apparatus in which, as exemplified by mobile terminals, the major functions of the apparatus are implemented on a single system LSI containing a processor. In such apparatus, it is sometimes the case that software such as an operation system that runs on the system LSI or an interface for exchanging information with other apparatus is disclosed to the public. Since the operation system or the interface is disclosed to the public, various third party software developers can develop their own software that runs on the apparatus.

However, when the interface or the operation system is disclosed to the public, it becomes easy for malicious third parties such as hackers to illegally alter the software that runs on the processor. It also becomes easy for malicious third parties using such illegally altered software to illegally copy or alter confidential information such as personal information or copyrighted content stored in the apparatus, or to illegally use the apparatus.

In view of the above, various techniques have been proposed for preventing such illegal alteration of software and illegal copying of confidential information. For example, it is proposed to provide a system LSI with a separate circuit, such as an encryption circuit or an authentication circuit, dedicated to security protection. Such a dedicated circuit is effective in blocking hacker attacks from outside the apparatus, but is vulnerable to attacks from within the apparatus, such as hacking that a circuit controlling the security function may attempt.

For example, in order to prevent illegal copying of content, the content is transmitted or stored in encrypted form. However, if the encryption/decryption key is stolen when the apparatus reproduces the content using the key, the content could be illegally copied. For example, consider a situation in which the processor decrypts the content using the encryption/decryption key. In this case, if the processor handles the encryption/decryption key in an open environment, such as where the processor is accessible from the outside or where the specification of the operation system is disclosed, there is the danger that the encryption/decryption key may fall into the hands of a hacker.

Furthermore, volatile or nonvolatile memory areas which are contained in the system LSI but provided separately from the circuit dedicated to security purposes are basically areas that a third party can freely access. There is therefore the possibility that a hacker may store a hacking program in such memory areas by some kind of means. Should this happen, the hacker could hack (for example, illegally alter or illegally access) a legitimate program or confidential information (including key information and personal information) stored in such memory areas.

For example, even when personal information, etc. are stored in encrypted form in a nonvolatile memory area, if the key for decrypting the personal information is also stored in the same memory area, there is a risk that the information contained in the memory area may be analyzed by a hacker with the intention of stealing the personal information. Further, even if a decryption of the personal information using a special decryption program stored in the nonvolatile memory area is performed, there is still a concern that the program may be analyzed by a hacker, resulting in the leakage of information. The hacker could also analyze the special program and alter the program so as to leak the personal information.

In this way, by illegally accessing the memory areas provided separately from the circuit dedicated to security protection, a malicious third party could steal the confidential information stored in such memory areas. Furthermore, if the program handling the confidential information were illegally altered by a malicious third party so as to leak the confidential information, the confidential information could be stolen in an indirect manner.

Further, in order to protect information stored within the apparatus, it is proposed that a security card responsible for part of the security function be connected to the system LSI (for example, refer to Japanese Laid-open Patent Publication No. 2007-281813). For example, in digital television broadcasting, the video stream is compressed and encoded with a scramble key, and the broadcast video stream carries the scramble key that is used to decode the video stream and that is updated every few seconds. On the other hand, a work key for decrypting the scramble key is built into the security card. Then, a portion of the program (channel) information (the above-mentioned stream) selected by a tuner is input to the security card under the control of a program running on a main processor incorporated in the system LSI. Then, the decrypted scramble key is output from the security card. The decrypted scramble key is received by the main processor and is input, for example, to an encryption circuit. The compressed video stream encoded with the scramble key is input to the encryption circuit together with the scramble key, and the encryption circuit decrypts the compressed video stream for output. The compressed video stream thus decrypted is input to a video processing circuit where the compressed video stream is expanded and converted into YpbPr or RGB video signals. The video signals are input to a graphics circuit. The graphics circuit inserts additional information such as a program title into the video signals, and the resulting video is output to a monitor. The monitor displays the obtained video.

SUMMARY

Since the security card is a secure module (tamper-proof module) which is extremely difficult to alter or access from the outside, confidential information such as the work key built into the security card is least likely to be leaked. However, since most of the above-described video processing is performed by the main processor using a memory area provided separately from the security card, it is not possible to eliminate the possibility of hacking.

According to one embodiment, an information processing device is provided. The information processing device includes a first processor, an information protection circuit, and a first communication path for connecting between the information protection circuit and the first processor. The information protection circuit includes an interface circuit for connecting the information protection circuit to the first communication path, a second processor, and a first memory which is inaccessible from the first processor but accessible from the second processor. When a command received from the first communication path is a command destined for the information protection circuit, the interface circuit passes the command to the second processor, but when the command received from the first communication path is not a command destined for the information protection circuit, the interface circuit does not pass the command to the second processor. Then, when the command destined for the information protection circuit is received from the first processor via the first communication path, the second processor executes a process related to information stored in the first memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating one example of scan program code.

DESCRIPTION OF EMBODIMENTS

An information processing device according to various embodiments will be described below with reference to the drawings. The information processing device is implemented, for example, as a system LSI, and includes as a part thereof an information protection unit which handles confidential information. The information protection unit includes a volatile memory circuit and a nonvolatile memory circuit which store confidential information and a program for handling the confidential information, and a processor on which at least a portion of the program for handling the confidential information is executed. The memory incorporated in the information protection unit cannot be accessed from outside the information protection unit. When a command for invoking the information protection unit is received by the information protection unit from a main processor via a bus, the processor incorporated in the information protection unit analyzes the command and accesses the designated area in the memory of the information protection unit. Then, the information protection unit outputs the confidential information requested from the outside in a form that requires that the information protection unit be accessed in order to completely reproduce the requested confidential information. Alternatively, the information protection unit expands only a portion of the program in an external memory area and expands the other portion of the program in the memory area within the information protection unit. In this way, the information protection unit prevents the confidential information and the program from being analyzed or illegally altered.

Figure 1:
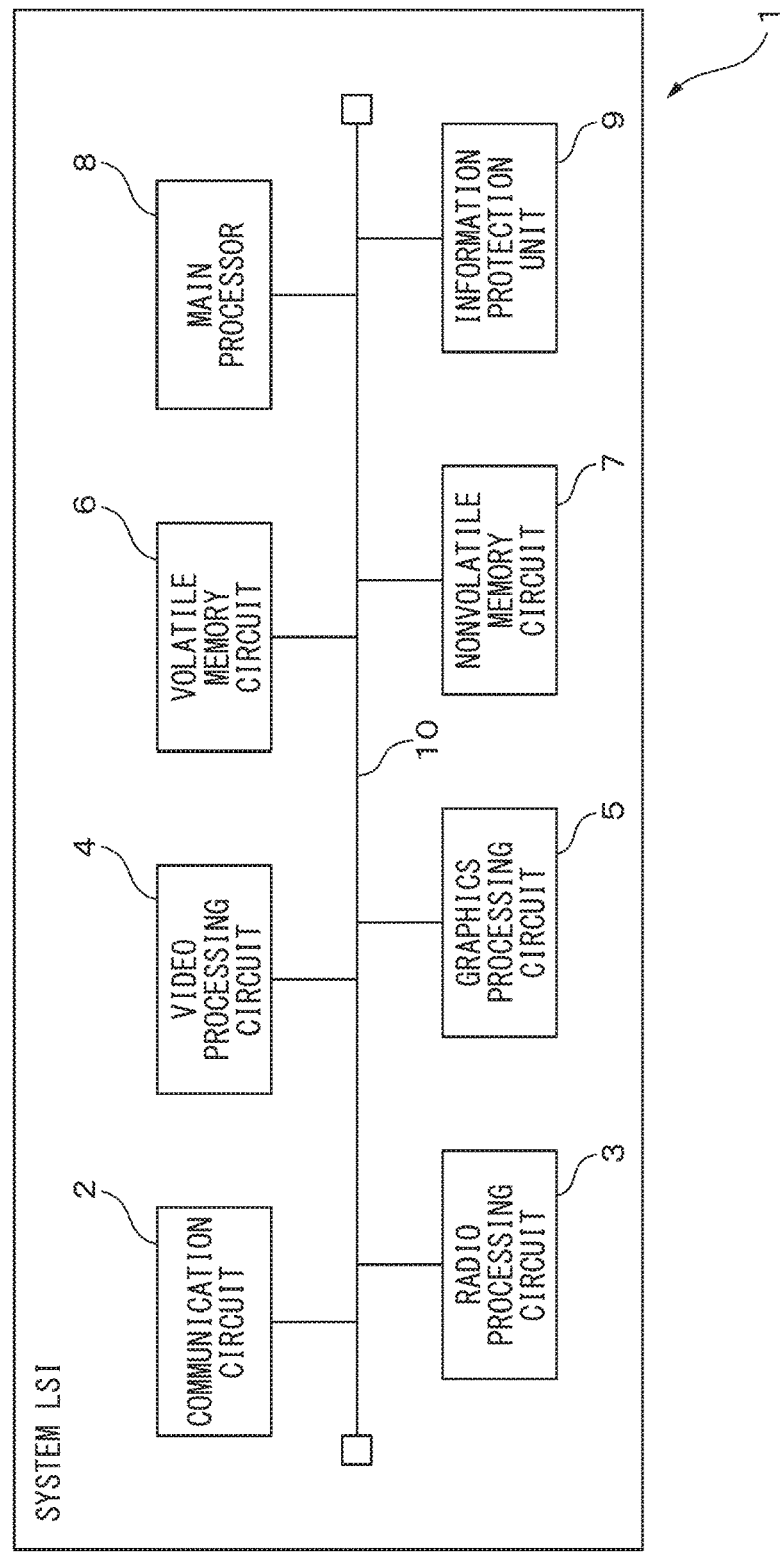
FIG. 1 is a diagram schematically illustrating the configuration of a system LSI as one example of an information processing device.

FIG. 1 is a diagram schematically illustrating the configuration of a system LSI as one example of an information processing device. The system LSI 1 is, for example, a single integrated circuit, and includes a communication circuit 2, a radio processing circuit 3, a video processing circuit 4, a graphics processing circuit 5, a volatile memory circuit 6, a nonvolatile memory circuit 7, a main processor 8, and an information protection unit 9. These units constituting the system LSI 1 are interconnected so as to be able to communicate with each other via a bus 10. The system LSI 1 can be incorporated in a variety of apparatuses, such as a mobile telephone, a portable information terminal, a computer, or a television receiver.

The communication circuit 2 is an interface circuit for connecting the system LSI 1 to a communication network, and transmits and receives information in accordance with the standard employed by the communication network. The communication network standard may be, for example, the Ethernet (registered trademark). The communication circuit 2 passes information received via the communication network to the main processor 8 or the information protection unit 9. Further, the communication circuit 2 outputs information received from the main processor 8 or the information protection unit 9 onto the communication network.

The radio processing circuit 3 extracts information contained in a radio signal carried on a radio wave and received via an antenna (not depicted), and passes the extracted information to the main processor 8 or the information protection unit 9. The radio wave is, for example, a digital television broadcast radio wave, and the radio signal contains, for example, an encrypted and compressed video stream for one or more channels. In this case, the radio processing circuit 3 is a tuner, and extracts from the radio signal the encrypted and compressed video stream for the channel selected under the control of the main processor 8. Then, the radio processing circuit 3 passes the encrypted and compressed video stream to the main processor 8 or the information protection unit 9.

Alternatively, the radio processing circuit 3 may be a circuit that extracts various kinds of information contained in a radio signal received from a base station in accordance with a prescribed radio communication standard or generates a radio signal to be transmitted from the apparatus equipped with the system LSI 1 to the base station.

The video processing circuit 4 receives the compressed video stream decrypted by the main processor 8 or the information protection unit 9, and reconstructs the video data by expanding the compressed video stream in accordance with the compression coding scheme used to compress the video stream. The video processing circuit 4 expands the video stream compressed, for example, by a compression coding scheme such as Moving Picture Experts Group (MPEG)-2, MPEG-4, or H.264 MPEG-4 AVC. The video processing circuit 4 passes the pictures contained in the reconstructed video stream to the graphics processing unit 5 in the order in which the pictures are to be displayed.

The graphics processing unit 5 that received the pictures from the video processing circuit 4 displays the pictures in display order on a display device (not depicted) of the apparatus equipped with the system LSI 1.

The volatile memory circuit 6 includes, for example, a dynamic memory, and temporarily stores information that various kinds of programs running on the system LSI 1 handle.

The nonvolatile memory circuit 7 includes, for example, a nonvolatile random-access memory circuit such as Flash Memory (registered trademark) and a read-only memory circuit such as a mask ROM. The nonvolatile memory circuit 7 stores various kinds of information that need to be retained even when power to the system LSI 1 is removed and various kinds of programs that run on the system LSI 1 and that do not handle confidential information. The volatile memory circuit 6 or the nonvolatile memory circuit 7 may further store a portion of a program that is executed in cooperation with the information protection unit 9.

The main processor 8 includes, for example, a logical operation circuit and a numerical operation circuit, and executes various kinds of programs that run on the system LSI 1. Further, when handling confidential information, or when executing a program to be protected against illegal access, the main processor 8 sends a command appropriate to the currently executing program to the information protection unit 9. The command for accessing the information protection unit 9 is, for example, a bit string of a fixed or variable length, and contains at the head thereof command identification information represented by a bit string of a fixed length (for example, 4 to 8 bits) and indicating that the command is destined for the information protection unit 9. The command also contains, subsequent to the command identification information, a bit string of a fixed length (for example, 4 to 8 bits) indicating the command type and information necessary for the execution of the command. The bit string indicating the command type is uniquely defined for each command type. The main processor 8 receives information necessary for the execution of the program from the information protection unit 9.

The information protection unit 9 is a unit that performs processing related to security, and holds programs, etc., as well as the confidential information such as the personal information and decryption key, within the information protection unit 9. The information protection unit 9 is a tamper-proof module which is configured to make it difficult to externally access the various kinds of information and programs stored in the information protection unit 9 and illegally alter the information and programs.

Figure 2:
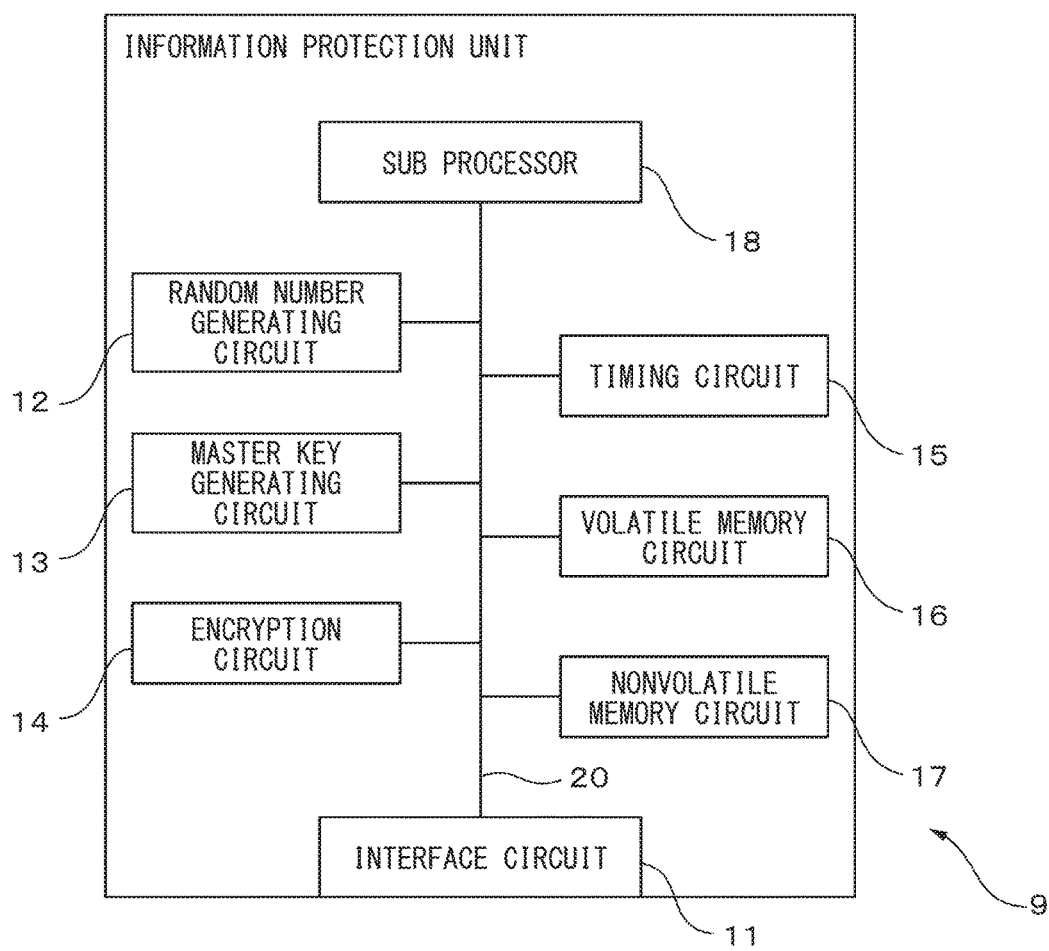
FIG. 2 is a diagram illustrating the hardware configuration of an information protection unit.

FIG. 2 is a diagram illustrating the hardware configuration of the information protection unit 9. The information protection unit 9 includes an interface circuit 11, a random number generating circuit 12, a master key generating circuit 13, an encryption circuit 14, a timing circuit 15, a volatile memory circuit 16, a nonvolatile memory circuit 17, and a sub processor 18. These units constituting the information protection unit 9 are interconnected so as to be able to communicate with each other via a bus 20. The random number generating circuit 12, the master key generating circuit 13, the encryption circuit 14, the timing circuit 15, the volatile memory circuit 16, and the nonvolatile memory circuit 17 are accessible from the sub processor 18, but not accessible from outside the information protection unit 9. In other words, only the sub processor 18 knows address information for accessing each of the random number generating circuit 12, the master key generating circuit 13, the encryption circuit 14, the timing circuit 15, the volatile memory circuit 16, and the nonvolatile memory circuit 17. On the other hand, the units located outside the information protection unit 9, including the main processor 8, have no knowledge of the address information for accessing any circuit contained in the information protection unit 9. When accessing any one of the circuits contained in the information protection unit 9, the sub processor 18 creates a command for accessing the desired circuit and outputs the command on the bus 20.

The interface circuit 11 is an interface for connecting the information protection unit 9 to the bus 10 of the system LSI 1. When the bit string carried at the head of the bit string received via the bus 10 matches the command identification information indicating that the command is destined for the information protection unit 9, the interface circuit 11 transfers the received bit string to the sub processor 18 via the bus 20. Further, the interface circuit 11 receives information or a portion of a program from the sub processor 18 via the bus 20, and outputs the received information or the portion of the program onto the bus 10. The interface circuit 11 may be configured so that a signal output from any unit other than the sub processor 18 in the information protection unit 9 will not be output outside the information protection unit 9. To achieve this, the sub processor 18, for example, appends at the head of a bit string containing the information to be output from the sub processor 18 to the outside of the information protection unit 9 an identification bit string of a fixed length indicating that the information is destined for a device outside the information protection unit 9. Then, of the bit strings output on the bus 20, the interface circuit 11 outputs only the bit string containing the identification bit string to the outside of the information protection unit 9.

Further, when an initializing command for initializing the information protection unit 9 is received via the bus 10, the interface circuit 11 passes the initializing command to the sub processor 18. The initializing command contains a command type indicating bit string indicating that the command is a command for initializing the information protection unit 9.

One of a plurality of terminal pins provided on the system LSI 1 may be connected to the sub processor 18 for input of the initializing command. In this case, when the initializing command is applied to the initializing command input pin, the information protection unit 9 is initialized.

The random number generating circuit 12 generates a random number in accordance with a prescribed random number generating method. The random number generating circuit 12 may employ any one of various known random number generating methods for generating a random number by software or hardware. The random number generated by the random number generating circuit 12 is used, for example, to divide a portion of a program into a subprogram to be executed within the information protection unit 9 and a subprogram to be executed by the main processor 8.

The master key generating circuit 13 generates a master key represented by a prescribed bit string. The master key is used, for example, to encrypt or decrypt the information that the information protection unit 9 handles. Further, to ensure security of a specific key or the like of the information protection unit 9, the master key can be used to encrypt the specific key with the master key.

The encryption circuit 14 encrypts the information that the information protection unit 9 handles, or decrypts the encrypted information, in accordance with a prescribed encryption scheme. The encryption scheme employed by the encryption circuit 14 may be any one of various known common key encryption schemes such as DES and AES, or any one of various known public key encryption schemes such as RSA and elliptic curve DSA. The encryption circuit 14 may be configured to support more than one encryption scheme. Further, the encryption circuit 14 may include a circuit for computing hash values for various kinds of information in accordance with a hash function.

If the sub processor 18 is configured to also perform processing such as information encryption/decryption or hash value computation in accordance with a program that runs on the sub processor 18, the encryption circuit 14 may be omitted.

The timing circuit 15 is a circuit that supplies a timing signal to each unit in the information protection unit 9. For example, when a clock signal for driving the entire system LSI 1 is input via an input terminal pin on the timing circuit 15, the timing circuit 15 is driven by the clock signal. Since the timing circuit 15 is not directly accessible from outside the information protection unit 9, the timing signal supplied from the timing circuit 15 is a highly reliable signal difficult to alter. Therefore, the timing signal supplied from the timing circuit 15 may be used outside the information protection unit 9.

The timing signal supplied from the timing circuit 15 (hereinafter referred to as the high-reliability timing signal for the sake of convenience) is used by the sub processor 18, for example, to check the time limit set for content viewing. Alternatively, the high-reliability timing signal may be used by various digital rights management (DRM) programs or conditional access system (CAS) programs that run on the sub processor 18.

The initialization of the timing circuit 15 is performed, for example, in accordance with the following procedure.

First, power is turned on to the apparatus equipped with the system LSI 1. Thereupon, the sub processor 18 in the information protection unit 9 is connected to a DRM server (not depicted) via a communication network or a base station in accordance with a DRM program stored in the volatile memory circuit 16 or the nonvolatile memory circuit 17. The sub processor 18 acquires highly reliable time information supplied from the DRM server at the instant of connection. At this time, in order to enhance security, communication between the DRM server and the apparatus equipped with the system LSI 1 may be performed in accordance with a prescribed encrypted communication method or the like. Then, the sub processor 18 initializes the timing circuit 15 at the time indicated by the time information. After the initialization is done, the timing circuit 15 outputs the high-reliability timing signal at the clock signal frequency, thus removing the connection between the apparatus equipped with the system LSI 1 and the DRM server. This serves to alleviate the burden of the communication network.

Depending on the design of the system LSI 1, the clock frequency of the system LSI 1 may be different from the clock frequency of the DRM server. In this case, the high-reliability timing signal may be corrected in accordance with the following procedure.

When a first access is made to the DRM server by the system LSI 1, the information protection unit 9 receives first time information from the DRM server. Then, the sub processor 18 initializes the timing circuit 15 at the time indicated by the first time information. Suppose, for example, that the value representing the time indicated by the first time information was "100". In this case, the initial value of the high-reliability timing signal output from the timing circuit 15 is also set to <100>.

After that, the system LSI 1 reconnects to the DRM server and receives second time information. Suppose that the value representing the time indicated by the second time information was "120". On the other hand, suppose that the value of the time indicated by the high-reliability timing signal output from the timing circuit 15 was, for example, <140> at the time of reception of the second time information by being counted up at every clock frequency of the system LSI 1.

The sub processor 18 can correct the high-reliability timing signal based on the second time information. In this example, the difference between the value of the high-reliability timing signal at the time of reception of the first time information and the value of the high-reliability timing signal at the time of reception of the second time information is <40>. On the other hand, the actual elapsed time is "20" as indicated by the difference between the time of reception of the first time information and the time of reception of the second time information. From this, it can be seen that the ratio of the clock frequency of the high-reliability timing signal to the clock frequency of the DRM server is 2(=<40>/"20").

Then, when using the high-reliability timing signal, the sub processor 18 calculates the corrected time value Ct in accordance, for example, with the following equation.

$$Ct = C0 + (Cc - C0)/r$$

where C0 is the initial value of the high-reliability timing signal, and Cc is the current value of the high-reliability timing signal. On the other hand, r is the ratio of the clock frequency of the high-reliability timing signal to the clock frequency of the DRM server; in the above example, r is 2. The ratio r, for example, once calculated, is stored in the nonvolatile memory circuit 17. Therefore, once the ratio r is calculated, the sub processor 18 need only refer to the nonvolatile memory circuit 17 for the ratio r; i.e., the calculation of the ratio r need be performed only once.

The sub processor 18 performs the above described operation as needed. In this way, even when the clock frequency of the system LSI 1 is different from the clock frequency of the DRM server, the sub processor 18 can obtain highly reliable time information in accordance with the high-reliability timing information supplied from the timing circuit 15. Therefore, the sub processor 18 need not access the DRM server each time the time information is needed.

The calculation of the ratio r may be performed periodically (for example, once every hour or once every day). The reason is that since the clock circuit of the system LSI 1 is located outside the information protection unit 9, there is the possibility that the clock circuit may be replaced by another clock circuit. If a mismatch occurs a plurality of times in succession between the time value obtained by correcting the value of the high-reliability timing signal and the time value indicated by the time information received from the DRM server, the cause could be that the clock circuit of the system LSI 1 has been replaced by another one. Should this happen, the sub processor 18 may put the information protection unit 9 in an error state and may stop the operation of the information protection unit 9 after storing an error state indicating flag in the nonvolatile memory circuit 17. In this case, recovery from the error state is accomplished, for example, by once again powering up the apparatus equipped with the system LSI 1 or by receiving an error state release instruction from the management server (not depicted) of the information protection unit 9 via the communication network.

The volatile memory circuit 16 includes, for example, a dynamic memory, and temporarily stores at least a portion of the currently executing program as well as the information that the information protection unit 9 handles.

The nonvolatile memory circuit 17 includes, for example, a nonvolatile random-access memory circuit such as Flash Memory (registered trademark) and a read-only memory circuit such as a mask ROM. The nonvolatile memory circuit 17 stores various kinds of confidential information that need to be retained even when power to the information protection unit 9 is removed and various kinds of programs that run on the information protection unit 9. The memory capacity of the nonvolatile memory circuit 17 may be smaller than the memory capacity of the nonvolatile memory circuit 7 incorporated in the system LSI 1. Since the number of costly nonvolatile memories can be reduced, the manufacturing cost of the system LSI 1 can also be reduced.

The nonvolatile memory circuit 17 stores, for example, confidential information or programs such as described below. All of the various kinds of confidential information and all of the programs described below may be stored in the nonvolatile memory circuit 17 or only some of them may be stored.

Identification information of the information protection unit 9 itself. This identification information is uniquely set for each information protection unit 9 and is used, for example, when downloading a program or at the time of factory shipment or for initialization.

Specific key of the information protection unit 9, which is uniquely set for each information protection unit 9.

Download program and confidential information for downloading, which are used to download a desired program into the volatile memory circuit 16 or nonvolatile memory circuit 17 incorporated in the information protection unit 9. The confidential information for downloading may be the identification information of the information protection unit 9 itself and the specific key of the information protection unit 9.

Service-specific information and service-related information. These pieces of information include associating information for indicating an association between a portion of a service execution program that runs on the sub processor 18 and the other portion thereof that runs on the main processor 8 of the system LSI 1. Alternatively, the service-specific information and service-related information may include, for example, associating information for associating the service execution with the corresponding function of the management server.

Various kinds of programs necessary for service execution. These programs may be encrypted using an encryption key known only to the information protection unit 9, for example, the above-described specific key.

Various kinds of encryption keys.

Compared with the volatile memory circuit 16, the nonvolatile memory circuit 17 is costly and takes longer time to access. Therefore, of the various kinds of information and programs stored in the nonvolatile memory circuit 17, the information or program to be actually used is first copied to the volatile memory circuit 16. Then, the sub processor 18 executes necessary processing by accessing the information or program stored in the volatile memory circuit 16; in this way, the processing speed can be enhanced.

The sub processor 18 includes, for example, a logical operation circuit and a numerical operation circuit, and executes processing of the portions related to the confidential information in various kinds of programs that runs on the system LSI 1.

Figure 3:
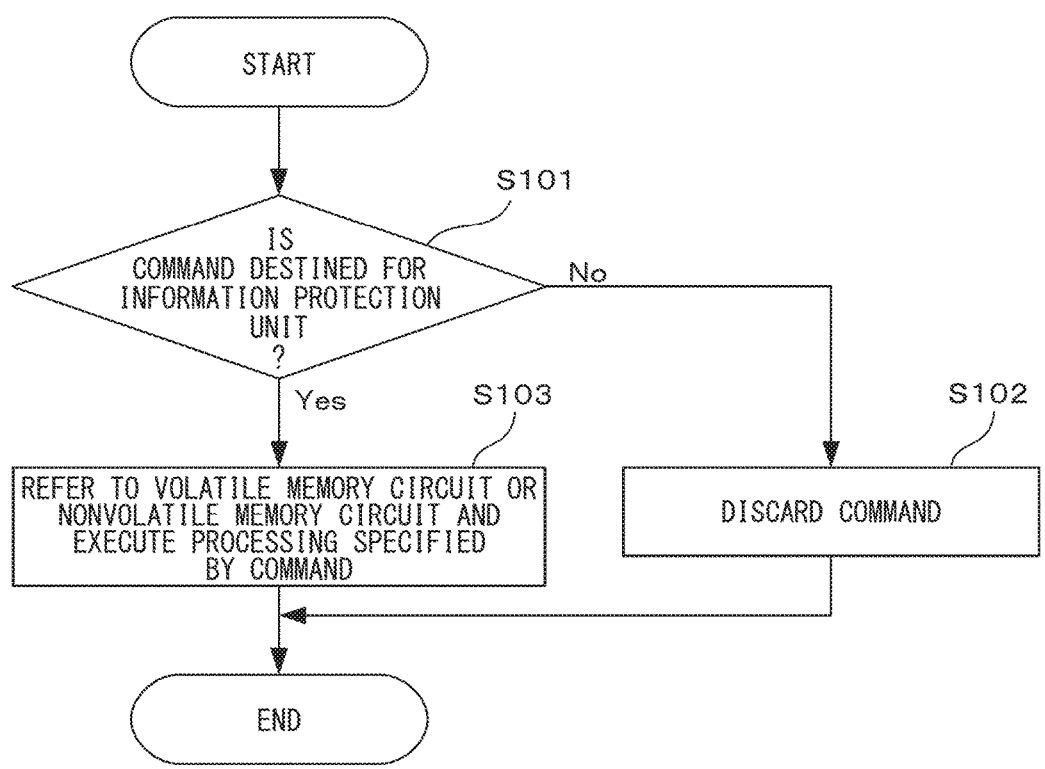
FIG. 3 is an operation flowchart of information processing performed by the information protection unit.

FIG. 3 is an operation flowchart of the information processing performed by the information protection unit 9. The interface circuit 11 checks to see whether or not the command received via the bus 10 is a command destined for the information protection unit 9 (step S101). If the command is not a command destined for the information protection unit 9 (No in step S101), the interface circuit 11 does not pass the command to the sub processor 18 but discards it (step S102).

On the other hand, if the command is a command destined for the information protection unit 9 (Yes in step S101), the interface circuit 11 passes the command to the sub processor 18. Then, the sub processor 18 refers to the volatile memory circuit 16 or the nonvolatile memory circuit 17 and executes the processing specified by the command (step S103).

Various processing performed by the information protection unit 9 will be described below.

(Program Download and Billing)

First, a method of downloading various kinds of programs into the information protection unit 9 from the server (not depicted) connected to the apparatus equipped with the system LSI 1 via a communication network or the like will be described along with a method of billing the charges to the user of the information protection unit 9.

As a first method, a method that uses a common key will be described.

In this case, the identification information and specific key information of the information protection unit 9 are prestored in the nonvolatile memory circuit 17 of the information protection unit 9. On the other hand, in the server which manages the information protection unit 9, identification information unique to each information protection unit 9 and key information for safe transmission/reception of information between the server and the information protection unit 9, i.e., information for preventing leakage of information to a third party during transmission/reception, are prestored.

The user of the apparatus equipped with the system LSI 1 performs an operation, via a user interface such as a keyboard or touch panel on the apparatus, to request display of the identification information stored in the information protection unit 9. This operation may be included in an operation performed to request a program download. When the operation for requesting display of the identification information is performed, the main processor 8 of the system LSI 1 creates a command for requesting the information protection unit 9 to retrieve the identification information, and transmits the command to the information protection unit 9 via the bus 10. When the command is received via the interface circuit 11, the sub processor 18 in the information protection unit 9 retrieves the identification information from the nonvolatile memory circuit 17. Then, the sub processor 18 transmits the identification information to the main processor 8. The main processor 8 that received the identification information displays the identification information on the display section of the apparatus equipped with the system LSI 1. The display section may be integrated into the user interface.

Further, the user of the apparatus equipped with the system LSI 1 sends the user's unique information, for example, the user's name, address, bank account number, etc. via telephone or via electronic mail to the management center that manages the server. At the management center, an operator checks the confidence of the user based on the user's unique information, etc. If the caller or sender can be verified as the user himself or a legitimate proxy of the user, the operator creates management data so that the identification information of the information protection unit 9 and the user's unique information can be managed at the server by linking them together. The server encrypts the requested program by using the specific key of the information protection unit 9 which is known only to the information protection unit 9 and the server. Then, the server transmits the encrypted program via a communication network or via a broadcast network to the apparatus equipped with the system LSI 1. Since the transmitted program is encrypted, and since the encryption key for decrypting the encrypted program is known only to the information protection unit 9 and the server, the secrecy of the program can be maintained, regardless of the kind of the path via which the program is transmitted. When the encrypted program is received, the system LSI 1 creates a download command for the information protection unit 9 by including the program therein, and sends the download command to the information protection unit 9. When the download command is received via the interface circuit 11, the sub processor 18 in the information protection unit 9 decrypts the encrypted program included in the download command by using the specific key. Since the program itself is decrypted within the information protection unit 9 which is difficult to access from the outside, the secrecy of the program can be maintained.

Each time a program download is done, the server bills the charge for the downloaded program to the user identified by the user's unique information stored together with the identification information of the information protection unit 9 that requested the download.

Next, a method that uses a public/secret key pair will be described. The following describes differences from the method that uses the common key described above.

The public key encryption schemes such as RSA encryption have the property that information encrypted using the secret key can only be decrypted using the public key and information encrypted using the public key can only be decrypted using the secret key. Therefore, the public/secret key pair of the information protection unit 9 and the public key of the server are prestored as specific key information in the nonvolatile memory circuit 17 of the information protection unit 9. On the other hand, the server holds, for each information protection unit 9, the public key of the information protection unit 9 and the public/secret key pair of the server along with the identification information of the information protection unit 9.

In this example, the server encrypts a program using a one-time key which is known only to the information protection unit 9 and the server. The server transmits the program encrypted with the one-time key to the apparatus equipped with the system LSI 1. The information protection unit 9 receives from the main processor 8 of the system LSI 1 a downloaded program which contains the program encrypted with the one-time key. Then, the sub-processor 18 in the information protection unit 9 decrypts the encrypted program using the one-time key.

The one-time key is shared between the information protection unit 9 and the server, for example, in the following manner. First, the server generates a random number A in accordance with a prescribed random number generating scheme, and stores the random number A in a storage device in the server. Then, the server transmits the random number A to the apparatus equipped with the system LSI 1. The main processor 8 of the system LSI 1 passes a one-time key generate command containing the random number A to the information protection unit 9.

When the one-time key generate command is received, the sub processor 18 in the information protection unit 9 encrypts the random number A contained in the command by using the secret key of the information protection unit 9. Further, the sub processor 18 generates a one-time key and encrypts the one-time key by using the public key of the server. The sub processor 18 causes the random number generating circuit 12 to generate a random number B. Then, the sub processor 18 transmits the random number B via the communication circuit 2 to the server together with the one-time key encrypted using the public key of the server and the random number A encrypted using the secret key of the information protection unit 9. The sub processor 18 stores the one-time key and the random number B in the volatile memory circuit 16.

The server decrypts the random number A encrypted with the secret key of the information protection unit 9 by using the public key of the information protection unit 9, and verifies that it matches the random number A, thus confirming that the server is connected to the system LSI 1. Further, the server encrypts the random number B by using the secret key of the server, and transmits it to the apparatus equipped with the system LSI 1. Further, the server, using the secret key of the server, decrypts the one-time key encrypted with the public key of the server and received from the information protection unit 9.

The main processor 8 of the system LSI 1 passes a one-time key sharing verify command containing the encrypted random number B to the information protection unit 9.

When the one-time key sharing verify command is received via the interface circuit 11, the sub processor 18 in the information protection unit 9 decrypts the random number B encrypted with the secret key of the server by using the public key of the server, and verifies whether it matches the random number B stored in the nonvolatile memory circuit 16. If the decrypted random number B matches the random number B stored in the nonvolatile memory circuit 16, the sub processor 18 verifies that the system LSI 1 is connected to the server.

With the above procedure, the authentication between the server and the information protection unit 9 is accomplished, and the one-time key is shared between the server and the information protection unit 9.

The main processor 8 of the system LSI 1 may create a unique information encrypt command containing the user's unique information and transmit the unique information encrypt command to the information protection unit 9. The sub processor 18 in the information protection unit 9 may encrypt the unique information contained in the unique information encrypt command by using the common key or the one-time key and return the encrypted unique information to the main processor 8. Then, the main processor 8 may transmit the encrypted unique information to the server.

The server may also store manufacture's identification information together with the identification information of the information protection unit 9 that downloaded the program. Manufacture's identification information is the information for identifying the manufacturer of the apparatus equipped with the system LSI 1 containing the information protection unit 9 or the manufacturer of the system LSI 1 containing the information protection unit 9. Then, each time a program download is done, the server may bill the charge for the downloaded program to the manufacturer identified by the manufacture's identification information stored together with the identification information of the information protection unit 9 that requested the download. A predetermined number of least significant digits (or most significant digits) in the identification information of the information protection unit 9 may be allocated as the manufacture's identification information.

(Program Execution)

Next, a description will be given of how the program is executed on the system LSI 1. In the present embodiment, the main processor 8 executes a portion of the program, while the sub processor in the information protection unit 9 which is difficult to access from the outside executes the other portion of the program, and thus the information protection unit 9 prevents the confidential information that the program handles from being leaked or illegally altered.

For example, the program stored in the volatile memory circuit 6 and executed by the main processor 8 runs on an operation system whose specification is open to the public. Further, the volatile memory circuit 6 is accessible by a third party. Therefore, the program and the data that the program handles could be illegally viewed, copied, altered, or used by a malicious third party. For example, if the program to be executed by the main processor 8 is a program for allowing the viewing of content and billing the charge for the viewing, there is a concern that a malicious user may alter the program or billing data so that, if the user has viewed the content 10 times, for example, the user will be charged by considering that the user has viewed the content only once.

On the other hand, the information protection unit 9 can only be accessed by a prescribed command issued from the main processor 8, the configuration of the information protection unit 9 being such that neither the information stored in the volatile memory circuit 16 nor the information stored in the nonvolatile memory circuit 17 can be accessed directly from outside the information protection unit 9. Further, the sub processor 18 of the information protection unit 9 does not access the information stored in any memory circuit in the system LSI 1, except the information passed from the main processor 8 by a prescribed command. Furthermore, the program that runs on the sub processor 18 uses only information generated or held within the information protection unit 9, such as the information stored in the volatile memory circuit 16 and the information stored in the nonvolatile memory circuit 17. Taking advantage of this characteristic of the sub processor 18, the information protection unit 9 according to the present embodiment prevents the program that the main processor 8 executes and the information that the program handles from being illegally viewed or altered. In the following description, the portion of the program that is executed on the sub processor 18 is called the program A, and the portion of the program that is executed on the main processor 8 is called the program B.

For example, suppose that an operation for executing a program stored in the nonvolatile memory circuit 17 in the information protection unit 9 is performed via the user interface of the apparatus equipped with the system LSI 1. In this case, the main processor 8 creates a program start command containing the identification information of the program specified by the operation, and sends the program start command to the information protection unit 9.

When the program start command is received via the interface circuit 11, the sub processor 18 in the information protection unit 9 reads the nonvolatile memory circuit 17 to retrieve the program specified by the program start command. The sub processor 18 then divides the program between the program A and the program B on a module-by-module basis, for example, in accordance with the random number received from the random number generating circuit 12. For this purpose, a unique identification number, for example, is preassigned for each module of the program, and a table in which the identification numbers of the modules belonging to the program A and the identification numbers of the modules belonging to the program B are stored is constructed in advance for each random number generated by the random generating circuit 12. This table is stored in the nonvolatile memory circuit 17. The sub processor 18 refers to the table, and determines which modules belong to the program A and which modules belong to the program B in accordance with the random number received from the random number generating circuit 12.

The sub processor 18 copies the modules belonging to the program A into the volatile memory circuit 16. Further, the sub processor 18 creates, for each module, data containing the identification number of the module and a flag indicating whether the module belongs to the program A or not, and passes the data to the main processor 8 along with the modules belonging to the program B.

When calling any one module during the execution of the program, the main processor 8 refers to the flag of that module and determines whether the module belongs to the program A or not. If the module belongs to the program A, the main processor 8 creates a call command containing the identification number of the module and a parameter to be passed to the module, and sends the call command to the information protection unit 9.

When the call command is received via the interface circuit 11, the sub processor 18 in the information protection unit 9 identifies the module to be executed by referring to the module identification contained in the call command. Then, the sub processor 18 passes the parameter contained in the call command to the identified module, and executes the processing of the module. The sub processor 18 creates data indicating the processing result of the module, and passes the data to the main processor 8.

Since a portion of the program is executed as described above by the information protection unit 9 which is difficult to access from the outside, it becomes difficult to illegally refer to, copy, or alter the program and the data that the program handles.

Figure 4A:
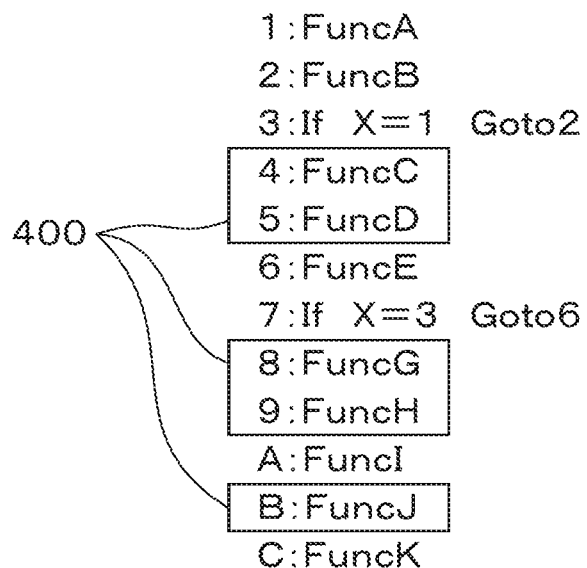
FIG. 4A is a diagram illustrating by way of example the modules belonging to program A and the modules belonging to program B.
Figure 4B:
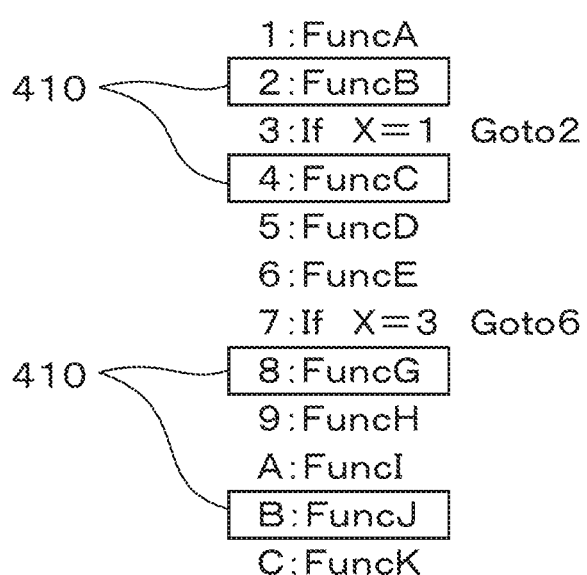
FIG. 4B is a diagram illustrating by way of example the modules belonging to program A and the modules belonging to program B.

FIGS. 4A and 4B are diagrams each illustrating by way of example the modules belonging to the program A and the modules belonging to the program B. The programs illustrated in FIGS. 4A and 4B are actually the same program, which includes modules FuncA to FuncK. In FIG. 4A, the modules FuncC, FuncD, FuncG, FuncH, and FuncJ, each enclosed by a frame 400, belong to the program A. On other hand, in FIG. 4B, the modules FuncB, FuncC, FuncG, and FuncJ, each enclosed by a frame 410, belong to the program A. In this way, by changing the modules belonging to the program A each time the program is started, the program B whose function appears the same on the outside but whose internal code is different is started; this makes it extremely difficult for a malicious third party to hack the program.

Each module of the program may be stored in the nonvolatile memory circuit 17 of the information protection unit 9 after being encoded using a key, for example, the specific key, that is held only within the information protection unit 9. In this case, when the program start command is received, the sub processor 18 decrypts the program specified by the program start command by using the key used to encrypt the program.

Further, each time the program start command is received, the sub processor 18 may change the code of the program B while ensuring that the same process is executed. For example, the sub processor 18 may change the code itself, or may change the description order of the modules in the program B while maintaining the calling order of each module by using a GOTO instruction.

Furthermore, each time the program start command is received, the sub processor 18 may insert a dummy code that performs processing having no relevance to the process that the program B executes or a dummy code that does nothing into a different position in the program B. Further, each time the program start command is received, the sub processor 18 may change the number of dummy codes to be inserted into the program B.

For this purpose, the codes belonging to the program B, which differ according to the random number generated by the random number generating circuit 12, are stored, for example, in the form of a table in the nonvolatile memory 17. The sub processor 18 refers to the table, and determines the code belonging to the program B in accordance with the random number received from the random number generating circuit 12.

Figure 5A:
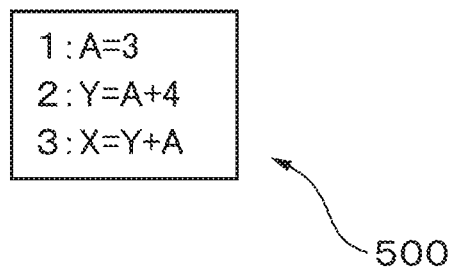
FIG. 5A is a diagram illustrating one example of the program B.
Figure 5B:
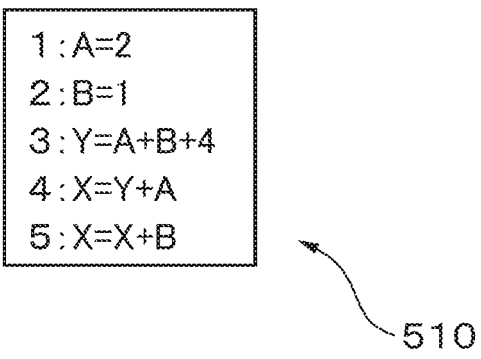
FIG. 5B is a diagram illustrating one example of the program B.

FIGS. 5A and 5B are diagrams each illustrating one example of the program B. In FIGS. 5A and 5B, symbols A, B, X and Y are variables. As is apparent from FIGS. 5A and 5B, the program 500 of FIG. 5A and the program 510 of FIG. 5B execute the same process, but the code description is different.

Figure 6A:
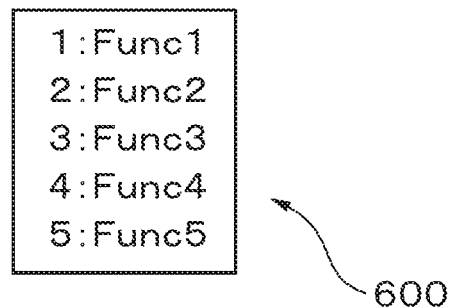
FIG. 6A is a diagram illustrating another example of the program B.
Figure 6B:
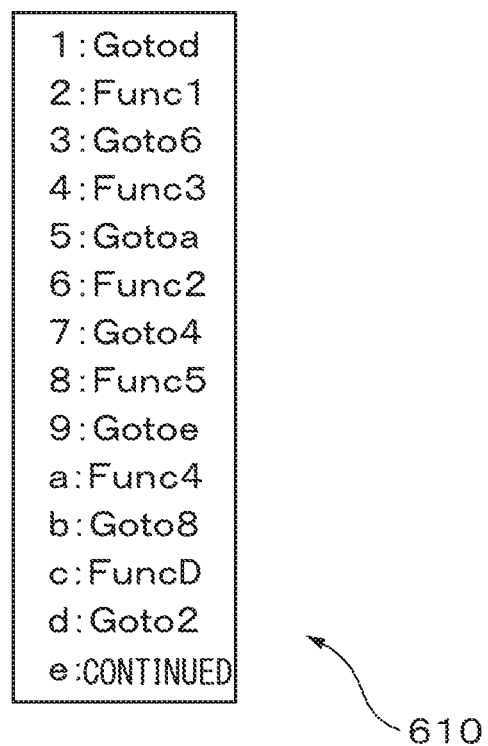
FIG. 6B is a diagram illustrating another example of the program B.

FIGS. 6A and 6B are diagrams illustrating other examples of the program B. In FIGS. 6A and 6B, each Funcm (m=1 to 5) represents one module. FuncD represents a dummy code. GotoX is a Goto instruction that causes the process to jump to line number X. The number appended to the left of each module or Goto instruction indicates the line number. In the illustrated examples, the program 600 of FIG. 6A and the program 610 of FIG. 6B both execute the process in the order of Func1 to Func5. However, since the description order of the modules is different between the program 600 and the program 610, for a malicious third party it is difficult to recognize that the process executed by the program 600 is the same as the process executed by the program 610. Further, the insertion of the dummy code in the program 610 makes it difficult to analyze the program B.

In the present embodiment, the program for changing the code of the program B each time the program is started is also executed by the sub processor 18 in the information protection unit 9. This drastically reduces the chance that the program for changing the code of the program B will be analyzed and the contents of the program B illegally altered or made known to a third party.

Further, the main processor 8 and the sub processor 18 may scan the executing program B at regular or irregular intervals of time to check to see if the program B is illegally altered or not.

First, the sub processor 18 generates a scan program for scanning the program B. The sub processor 18 passes the generated program to the main processor 8, and the main processor 8 writes the received scan program into the volatile memory circuit 6. The main processor 8 computes a scan operation value by executing the scan program and thereby performing a prescribed operation onto the memory area storing the program code of the program B from the volatile memory circuit 6. The main processor 8 generates a scan result notification command containing the scan operation value, and sends the scan result notification command to the information protection unit 9. The sub processor 18 in the information protection unit 9 receives the scan result notification command via the interface circuit 11 and determines, based on the scan operation value contained in the command, whether the program B is illegally altered or not. If it is determined that the program B is illegally altered, the sub processor 18 sends an instruction to the main processor 8 to stop the execution of the program B.

The scan program causes the main processor 8 to compute, for example, as the scan operation value, a hash value of a bit string within the memory area in which a portion or the whole of the program B is stored. Alternatively, the scan program causes the main processor 8 to compute the scan operation value by performing a numerical operation or a logical operation or a combination of a numerical operation and a logical operation onto bit strings within a plurality of memory areas in which different portions of the program B are stored.

The sub processor 18 compares the scan operation value received from the main processor 8 with the scan operation value that is stored in the volatile memory circuit 16 or nonvolatile memory circuit 17 of the information protection unit 9 as the scan operation value for the case where the program B is not altered. If the two scan operation values match, the sub processor 18 determines that the program B is not illegally altered; on the other hand, if the two scan operation values do not match, the sub processor 18 determines that the program B is illegally altered. The scan operation value stored within the information protection unit 9 is one that was computed by scanning the volatile memory circuit 16 containing the program B by using the scan program, for example, when the sub processor 18 generated the program B and the scan program. Alternatively, of the scan operation values received from the main processor 8, the most recent scan operation value received when it is determined that the program B is not altered may be stored in the volatile memory circuit 16 or nonvolatile memory circuit 17 of the information protection unit 9.

The scan operation value is not limited to the above example, but any of various other values computed based on the contents of the memory area containing the program may be used to detect whether the program is illegally altered or not.

Since the scan program is stored in the volatile memory circuit 6 which is accessible from a third party, it is not possible to eliminate the possibility that the scan program itself may be altered so that the result of the determination will always be obtained that indicates that the program B is not altered. It is therefore preferable to change the scan program as frequently as possible in order to make the hacking of the scan program difficult. The more frequently the scan program is changed, the less time is available for analyzing the scan program or altering the scan program so as to disable the detection of alteration of the program B. This makes it even more difficult to analyze the scan program or alter the scan program so as to disable the detection of alteration of the program B.

Each time the scan program is generated, the sub processor 18 changes the memory area to be scanned, the scan order for each memory area, the process for computing the scan operation value, the process for returning the scan operation value to the information protection unit 9, or the scan program code or the like.

FIG. 7 is a diagram illustrating one example of the scan program code. In the scan program 700, each line indicates one instruction. The main processor 8 sequentially executes the instructions contained in the scan program 700, starting from the instruction written in the first line.

In the illustrated example, it is assumed that a portion of the program B is stored in memory locations 31 to 35. The sub processor 18 can change the write memory locations (2001 to 2005) in a random manner each time the scan program is generated. In this case, the sub processor 18 may determine each write memory location by causing the random number generating circuit 12 to generate a random number for each read memory location, multiplying the random number by a predetermined coefficient and rounding the result to an integer, and adding the integer to the minimum value of the memory location that provides the write location candidate.

In the scan program 700, the process defined in the sixth and seventh lines corresponds to the scan value computing process. The sub processor 18 may change the processing contents of the sixth and seventh lines each time the scan program is generated. In that case, the sub processor 18 refers, for example, to a table that provides a mapping of random numbers to scan value computing operations, and identifies the scan value computing operation corresponding to the random number generated by the random number generating circuit 12 when generating the scan program. Then, the sub processor 18 includes the identified scan value computing operation into the scan program.

Further, in the scan program 700, the process defined in the eighth and ninth lines corresponds to the process for returning the scan value to the information protection unit 9. The sub processor 18 may changes the processing contents of the eighth and ninth lines each time the scan program is generated. In that case, the sub processor 18 takes, for example, the random number generated by the random number generating circuit 12 when generating the scan program, as a constant to be added to the scan operation value or as a constant by which to multiply the scan operation value.

When generating the program B, the sub processor 18 may embed an authentication code into the program B. In this case, the main processor 8 reads the authentication code during the execution of the program B, and authenticates the program B in accordance with the authentication code by using the information protection unit 9. The location of the authentication code need not be limited to any specific location; for example, the authentication code may be embedded at the head or the end of the program B, or may be embedded at an intermediate position in the program B. Further, more than one authentication code may be embedded into the program B.

An authentication process such as described below is performed using the authentication code.

(1) When generating the program B, the sub processor 18 defines constants X, Y, and Z as initial information at a predetermined position (for example, at the head of the code) in the program B. The constants X, Y, and Z are set to different values, for example, each time the program B is generated. Then, the sub processor 18 performs a prescribed operation using the constants X, Y, and Z and stores the result of the operation in the volatile memory circuit 16 of the information protection unit 9. The prescribed operation may be a numerical operation, a logical operation, or a combination of a numerical operation and a logical operation. In this example, the prescribed operation is defined as W0=X*Y+Z, and the value W0 obtained by performing this operation is stored in the volatile memory circuit 16. Further, by executing the program B, the constants X, Y, and Z are stored, for example, in one of the memory areas within the volatile memory circuit 6.

(2) When the embedded authentication code is encountered during the execution of the program B, the main processor 8 reads the constants X, Y, and Z from the volatile memory circuit 6.

(3) The main processor 8 performs the prescribed operation (in this example, W=X*Y+Z) using the constants X, Y, and Z.

(4) The main processor 8 creates an authentication request command containing the obtained value, and sends the authentication request command to the information protection unit 9.

(5) The sub processor 18 that received the authentication request command via the interface circuit 11 compares the value W contained in the command with the value W0 stored in the volatile memory circuit 16 of the information protection unit 9. If the values W and W0 match, the sub processor 18 sends a signal permitting the program B to continue execution to the main processor 8. On the other hand, if the values W and W0 do not match, the sub processor 18 sends a signal that directs stopping of the program B to the main processor 8, because it is highly likely that the program B is altered.

(6) When the signal permitting the program B to continue execution is received from the sub processor 18, the main processor 8 proceeds to execute the process that follows the authentication code. On the other hand, when the signal directing stopping of the program B is received, the main processor 8 stops the execution of the program B. Further, the sub processor 18 may stop the operation of the information protection unit 9 and hold the information protection unit 9 in a stopped condition until the apparatus equipped with the system LSI 1 is powered up once again.

When more than one authentication code is contained in the program B, the main processor 8 and the sub processor 18 repeat the process of steps (2) to (6) each time an authentication code is encountered during the execution of the process. In this case, the constants used for the authentication may be made different for each authentication code, and the operation performed using the constants may also be made different for each authentication code.

The authentication code may be changed each time the program B is generated. For example, the values of the constants X, Y, and Z may be changed each time the program B is generated, or the operation performed using the constants X, Y, and Z may be changed. Further alternatively, the combination of constants used for the execution of the authentication may be changed each time the program B is generated. For example, by referring to a table that provides a mapping of random numbers to authentication codes, the sub processor 18 may determine the authentication code corresponding to the random number generated by the random number generating circuit 12 when generating the program B, and may embed the determined authentication code into the program B. By changing the authentication code each time the program B is generated, it becomes extremely difficult for the program B to succeed in authentication if the program B has been altered by a third party.

The sub processor 18 may impose a time limit on the authentication process. For example, the sub processor 18 may determine as the start time of the program B the time indicated by the high-reliability timing signal that is output from the timing circuit 15 when the program B with the authentication code embedded therein is sent to the main processor 8, and may store the determined start time in the volatile memory circuit 16.

If the authentication request command is not received within a predefined time interval from the start time of the program B, the sub processor 18 determines that the authentication process of the program B is illegally altered. Then, the sub processor 18 sends a signal that directs stopping of the program B to the main processor 8. In this way, the information protection unit 9 can eliminate the time available for a third party to forge the authentication code. Further, by setting a time limit on the authentication process, the information protection unit 9 can prevent the process from ending up outputting a result indicating that the authentication is successfully done if the result of the authentication is not returned forever.

(Utilizing a Memory Circuit Outside the Information Protection Unit)

Next, a description will be given of an example in which the confidential information is stored in a memory circuit outside the information protection unit 9. Since the nonvolatile memory circuit is generally costly compared with the volatile memory circuit, it is preferable from the standpoint of cost to reduce as much as possible the memory capacity of the nonvolatile memory circuit incorporated in the information protection unit 9. Therefore, in the example illustrated herein, the memory capacity of the nonvolatile memory circuit 17 in the information protection unit 9 is held to a minimum, and instead, a memory circuit outside the information protection unit 9 is utilized.

First, a description will be given of a disadvantage that can result when the encrypted confidential information is simply stored in the nonvolatile memory circuit 7 in the system LSI 1.

Suppose, for example, that the confidential information such as the identification information and specific key information of the information protection unit 9 is stored in the nonvolatile memory circuit 7 by being encrypted using an encryption key known only to the information protection unit 9. Since these pieces of confidential information are encrypted using the encryption key known only to the information protection unit 9, the possibility of the encrypted information becoming known to a third party is small. However, it is not possible to eliminate the possibility of the entire confidential information stored in the nonvolatile memory circuit 7 being replaced. As a result, fraud such as described below may not be prevented.

For example, the information protection unit 9 stores the encrypted confidential information in the nonvolatile memory circuit 7 so that the confidential information that becomes necessary the next time the system LSI 1 is power up can be retained even when power to the system LSI 1 is removed. For example, the amount of money remaining in a prepaid account and content viewing history information are stores as the confidential information.

Suppose that, at some time in the past (for example, two months ago), the encrypted information stored in the nonvolatile memory circuit 7 was copied in its entirety to a memory in another device. Suppose that, at that time, 5000 YEN was recorded as the remaining amount of money and Movie 1 as the content viewing history information. Then, suppose that the user thereafter used the prepaid account for viewing Movies 2 and 3, etc. Suppose that, at the present time, 1000 YEN is recorded as the remaining amount of money and Movies 1, 2, and 3 as the content viewing history information.

Suppose that the encrypted information stored in the nonvolatile memory circuit 7 at the present time has been replaced by the encrypted information that was stored in the nonvolatile memory circuit 7 at some time in the past. In this case, the remaining amount of money indicates 5000 YEN when it should actually be 1000 YEN. Further, while Movies 1, 2, and 3 were actually viewed, only Movie 1 is recorded as the content viewing history information. Furthermore, since the encrypted information stored in the nonvolatile memory circuit 7 at some time in the past is also information encrypted by the information protection unit 9, it is difficult to identify whether the recorded information is illegally manipulated information or not. If such illegal copying is not prevented, a situation can occur where the remaining amount of money does not decrease no matter how much money the user may spend from some time in the past up to the present time.

In the present embodiment, to prevent such fraud, the main processor 8 and the sub processor 18 perform processing such as described below.

Each time the confidential information is updated, the main processor 8 creates a record update request command containing the updated confidential information, and sends the record update request command to the information protection unit 9. When the record update request command is received via the interface circuit 11, the sub processor 18 encrypts the confidential information contained in the record update request command by using an encryption key, for example, the specific key, known only to the information protection unit 9. Then, the sub processor 18 passes the encrypted confidential information to the main processor 8. The main processor 8 stores the encrypted confidential information in the nonvolatile memory circuit 7.

The sub processor 18 also passes the encrypted confidential information to the encryption circuit 14. The encryption circuit 14 computes the hash value of the encrypted confidential information. Then, the encryption circuit 14 returns the hash value to the sub processor 18. The sub processor 18 stores the hash value in the nonvolatile memory circuit 17 together with information indicating the kind of the confidential information.

When the updating or reference of the confidential information is requested by an application program or the like that is currently running, the main processor 8 reads the encrypted confidential information from the nonvolatile memory circuit 7, and creates a record verify command containing the encrypted confidential information. Then, the main processor 8 sends the record verify command to the information protection unit 9.

When the record verify command is received via the interface circuit 11, the sub processor 18 passes the encrypted confidential information contained in the record verify command to the encryption circuit 14. The encryption circuit 14 computes the hash value of the encrypted confidential information, and returns it to the sub processor 18.

The sub processor 18 compares the hash value received from the encryption circuit 14 with the hash value stored in the nonvolatile memory circuit 17. If the two hash values match, the sub processor 18 determines that the encrypted confidential information is not illegally altered. The sub processor 18 then decrypts the encrypted confidential information, and passes the decrypted confidential information to the main processor 8. The main processor 8 can thus refer to or update the decrypted confidential information.

On the other hand, if the two hash values do not match, the sub processor 18 determines that the encrypted confidential information is illegally altered. In this case, the sub processor 18 does not decrypt the confidential information, but notifies the main processor 8 that the confidential information is illegally altered.

With the above procedure, even when the confidential information is stored in a memory circuit outside the information protection unit 9, the system LSI 1 can prevent fraud from being conducted by replacing the present confidential information with the past confidential information. As a result, the memory capacity of the nonvolatile memory circuit 17 in the information protection unit 9 can be reduced.

The main processor 8 may include in the record verify command not only the encrypted confidential information but also the value of the confidential information after updating or the difference between the value of the confidential information before updating and the value of the confidential information after updating. In this case, the sub processor 18, after decrypting the encrypted confidential information, updates the value of the confidential information based on the value of the confidential information after updating or the difference between the value of the confidential information before updating and the value of the confidential information after updating. Then, the sub processor 18 encrypts the updated confidential information and returns the encrypted confidential information to the main processor 8, while at the same time, causing the encryption circuit 14 to compute the hash value of the updated confidential information. This further reduces the risk of confidential information leakage, since the updating of the confidential information is also performed by the sub processor 18 in the information protection unit 9 which is difficult to access from the outside.

Rather than computing the hash value of the encrypted confidential information, the encryption circuit 14 may compute the checksum of the encrypted confidential information and may store the checksum in the nonvolatile memory circuit 17. In this case, since the computation is simpler than the computation of the hash value, the encryption circuit 14 can be simplified.

Alternatively, the encryption circuit 14 may compute the hash value or checksum of the yet-to-be-encrypted confidential information and may store the hash value or checksum in the nonvolatile memory circuit 17.

The main processor 8 may include, in the record update request command and the record verify command, not only the confidential information to be updated but also all other confidential information. In this case, one hash value or checksum need only be computed for all the confidential information.

Further, the system LSI 1 may perform processing for digital television broadcast reception by using the memory circuit outside the information protection unit 9 to store confidential information. In this case, a CAS program is executed within the information protection unit 9 to perform processing related to the scramble key such as the decryption of the scramble key and processing such as the decryption and encryption of the work key. The encrypted work key may be stored in the nonvolatile memory circuit 7 outside the information protection unit 9.

The CAS program which is executed within the information protection unit 9 can be received from the broadcast station or server by the system LSI 1 and updated in accordance with the earlier described download procedure in the same manner as the programs A and B.

According to the current B-CAS (registered trademark), the CAS program can be divided into three blocks: the block responsible for the processing related to the scramble key such as the decryption of the scramble key, the block responsible for the processing related to the work key such as the decryption and encryption of the work key, and the block responsible for other processing. Accordingly, when updating the CAS program, the information protection unit 9 can update the block responsible for the processing related to the scramble key, the block responsible for the processing related to the work key, and the block responsible for other processing, independently of each other. In this case, the information protection unit 9 need only download the program block to be updated in accordance with the earlier described download procedure from the server or broadcast station. By downloading the program on a block-by-block basis, the information protection unit 9 can reduce the amount of information to be transferred for updating.

Alternatively, when updating the CAS program, the information protection unit 9 may download a portion of the CAS program, for example, the portion responsible for the handling of confidential information such as the processing related to the work key and the main processor 8 may download the other portion of the CAS program. By so doing, the system LSI 1 can reduce the time needed to download the updated program, while reducing the risk of leakage of the portion of the CAS program that handles the confidential information.

As has been described above, the information processing device includes, within the information protection unit, the sub processor which operates independently of the main processor and the memory circuit which is not accessible from the outside, and the sub processor and the memory circuit handle the confidential information or a portion of the program. Accordingly, the information processing device of the invention can prevent the confidential information and the program from being analyzed or illegally altered.

According to a modified example, encrypted confidential information may be stored in two or more memory areas within the nonvolatile memory circuit 7 provided outside the information protection unit 9 and the confidential information may be recovered only when all the pieces of the confidential information stored in the respective memory areas become available. In this case, confidential information recovery information, such as the addresses of the memory areas in which the confidential information is stored and the kind of the operation needed to recover the confidential information from the encrypted confidential information stored in the memory areas, is stored in the nonvolatile memory circuit 17 of the information protection unit 9.

For example, to recover the confidential information, the main processor 8 creates a confidential information recovery request command, and sends the command to the information protection unit 9. The information protection unit 9 responds to the command by returning the confidential information recovery information to the main processor 8. The main processor 8 then performs processing to recover the confidential information by referring to the confidential information recovery information.

For example, the main processor 8 retrieves the respective pieces of the encrypted confidential information from the corresponding memory areas specified by the addresses contained in the confidential information recovery information. Then, the main processor 8 reconstructs the confidential information by combining the respective pieces of the encrypted confidential information in accordance with a prescribed order specified by the confidential information recovery information. Alternatively, the main processor 8 may reconstruct the confidential information by performing prescribed operations specified by the confidential information recovery information onto the respective pieces of the encrypted confidential information.

According to another modified example, the nonvolatile memory circuit in which the confidential information is stored may be permanently fixed to the board of the apparatus equipped with the system LSI 1 so that the nonvolatile memory circuit cannot be removed without breaking it.

According to still another modified example, the information protection unit may be implemented in the form of an integrated circuit separate from the system LSI containing the main processor.

According to a further modified example, the determination as to whether the command is destined for the information protection unit or not may be made by the sub processor contained in the information protection unit. In this case, the interface circuit of the information protection unit may pass any command received via the bus of the system LSI to the sub processor.

According to a still further modified example, the bus connecting the interface circuit to the sub processor in the information protection unit and the bus connecting the interface circuit to other units of the information protection unit than the sub processor may be provided separately from each other. This makes it even more difficult to access each unit provided within the information protection unit from outside the information protection unit.

The main processor and the sub processor of the information protection unit need only be logically discriminated from each other, and need not necessarily be physically different entities. For example, the main processor and the sub processor may be physically the same processor, and this same processor may be made to operate as the main processor in normal mode and may be switched to operate as the sub processor in security mode. However, in this case, the memory areas that the processor operating in security mode refers to need to be made inaccessible from the processor operating in normal mode. To achieve this, for example, certain memory areas (corresponding to the volatile memory circuit 6 and the nonvolatile memory circuit 7) may be made accessible from the processor operating in normal mode and the other memory areas (corresponding to the volatile memory circuit 16 and the nonvolatile memory circuit 17) accessible only from the processor operating in security mode. Alternatively, the processor operating in security mode is unable to access designated memory areas (corresponding to the volatile memory circuit 16 and the nonvolatile memory circuit 17) without passing through an encryption/decryption process. In this case, the processor operating in normal mode and trying to access such memory areas is unable to access the memory areas because the memory areas are encrypted. On the other hand, the processor operating in security mode has a key, so that when reading information from the memory, the information stored in the memory area can be decrypted and, when writing information to the memory, the information to be stored in the memory area can be encrypted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a first processor;
an information protection circuit; and
a first communication path which provides a connection between the information protection circuit and the first processor, wherein
the information protection circuit includes:
an interface circuit which connects the information protection circuit to the first communication path;
a second processor;
a first memory which is inaccessible from the first processor but accessible from the second processor;
a random number generating circuit which is inaccessible from the first processor but accessible from the second processor and which generates a random number;
an encryption circuit which is inaccessible from the first processor but accessible from the second processor and which performs a prescribed operation on an input value; and
a timing circuit which is inaccessible from the first processor but accessible from the second processor and which generates a timing signal, and wherein
when a command received from the first communication path is a command destined for the information protection circuit, the interface circuit passes the command to the second processor, but when the command received from the first communication path is not a command destined for the information protection circuit, the interface circuit does not pass the command to the second processor, and
when the command destined for the information protection circuit is received from the first processor via the first communication path, the second processor executes a process related to information stored in the first memory, and wherein
the first memory stores an encryption key and a public key included in a public/secret key pair, and
when the second processor receives the command destined for the information protection circuit that contains a program encrypted using the encryption key, the second processor decrypts the encrypted program by using the encryption key, and wherein
the second processor sends a key obtained by encrypting the encryption key by using the public key and the random number generated by the random number generating circuit to a server where the public/secret key pair is stored, and when a value returned from the server and decrypted using the public key of the public/secret key pair matches the random number, the second processor uses the encryption key to decrypt the encrypted program.

2. The information processing device according to claim 1, wherein when a signal is issued from within the information protection circuit, when the signal contains destination information destined outside the information protection circuit, the interface circuit outputs the signal on the first communication path, but when the signal does not contain the destination information the information protection circuit, the interface circuit does not output the signal on the first communication path.

3. The information processing device according to claim 1, wherein the interface circuit and the second processor are interconnected via a second communication path, and
the first memory is connected to the second processor so that each other can communicate via a third communication path which is not connected to the interface circuit.

4. The information processing device according to claim 1, wherein the information protection circuit and the first processor are together implemented as a single integrated circuit.

5. An information processing method for use in an information processing device that comprises a first processor, an information protection circuit, and a communication path which connects between the information protection circuit and the first processor, wherein the information protection circuit includes an interface circuit which connects the information protection circuit to the communication path, a second processor, a memory which is inaccessible from the first processor but accessible from the second processor and stores an encryption key and a public key included in a public/secret key pair; a random number generating circuit which is inaccessible from the first processor but accessible from the second processor and which generates a random number; an encryption circuit which is inaccessible from the first processor but accessible from the second processor and which performs a prescribed operation on an input value; and a timing circuit which is inaccessible from the first processor but accessible from the second processor and which generates a timing signal, the information processing method comprising:
determining, by the interface circuit, whether a command received via the communication path is a command destined for the information protection circuit;
when the received command is a command destined for the information protection circuit, executing, by the second processor, a process related to information stored in the memory in accordance with the command by using at least one of the random number generating circuit, the encryption circuit and the timing circuit; and
decrypting, when the second processor receives the command destined for the information protection circuit that contains a program encrypted using the encryption key, by the second processor, the encrypted program by using the encryption key, and wherein
the information processing method further comprises:
sending, by the second processor, a key obtained by encrypting the encryption key by using the public key and the random number generated by the random number generating circuit to a server where the public/secret key pair is stored; and
using, when a value returned from the server and decrypted using the public key of the public/secret key pair matches the random number, by the second processor, the encryption key to decrypt the encrypted program.

6. An information processing device comprising:
a first processor;
an information protection circuit; and
a first communication path which provides a connection between the information protection circuit and the first processor, wherein
the information protection circuit includes:
an interface circuit which connects the information protection circuit to the first communication path;
a second processor; and
a first memory which is inaccessible from the first processor but accessible from the second processor, and wherein
when a command received from the first communication path is a command destined for the information protection circuit, the interface circuit passes the command to the second processor, but when the command received from the first communication path is not a command destined for the information protection circuit, the interface circuit does not pass the command to the second processor, and
when the command destined for the information protection circuit is received from the first processor via the first communication path, the second processor executes a process related to information stored in the first memory, wherein
when the second processor receives a command for executing the program as the command destined for the information protection circuit, the second processor divides the program into first and second portions, and passes the second portion of the program to the first processor along with information indicating the first portion of the program, and when the second processor receives a command for executing the first portion of the program from the first processor as the command destined for the information protection circuit, the second processor performs execution of the first portion.

7. The information processing device according to claim 6, wherein the information protection circuit further includes a random number generating circuit which is inaccessible from the first processor but accessible from the second processor and which generates a random number, and wherein
each time the second processor receives a command for executing the program as the command destined for the information protection circuit, the second processor causes the random number generating circuit to generate a random number, and changes the second portion of the program by referring to a table that provides a mapping between random numbers stored in the first memory and the second portion of the program and by identifying the second portion corresponding to the generated random number.

8. The information processing device according to claim 7, wherein the second portion of the program includes a plurality of modules, and the second processor changes, based on the generated random number, the order in which the plurality of modules are described, without changing the order in which the plurality of modules are called in order to execute the program.

9. The information processing device according to claim 7, wherein the second processor determines, based on the generated random number, the number of dummy codes that do nothing or that perform processing having no relevance to the execution of the second portion, determines positions at which the dummy codes are to be inserted, and inserts the determined number of dummy codes at the determined insertion positions in the second portion.

10. The information processing device according to claim 6, wherein the information protection circuit further includes a random number generating circuit which is inaccessible from the first processor but accessible from the second processor and which generates a random number, and the program includes a plurality of modules, and wherein
each time the second processor receives a command for executing the program as the command destined for the information protection circuit, the second processor causes the random number generating circuit to generate a random number, and changes the way the plurality of modules are allocated between the first and second portions by referring to a table that provides a mapping between random numbers stored in the first memory and modules belonging to the second portion of the program and by identifying the modules belonging to the second portion that correspond to the generated random number.

11. The information processing device according to claim 6, further comprising a second memory which stores the second portion of the program, and wherein the second processor generates a scan program for computing a scan operation value from the second portion of the program, computes a first scan operation value by using the scan program and stores the first scan operation value in the first memory, and passes the scan program to the first processor, and when the second processor receives the command destined for the information protection circuit that contains a second scan operation value that the first processor computed by executing the scan program on the second memory, the second processor compares the second scan operation value with the first scan operation value and, when the second scan operation value does not match the first scan operation value, sends a signal to the first processor to notify that the second portion of the program has been illegally altered.

12. The information processing device according to claim 11, wherein the second processor changes the scan program, and each time the scan program is changed, the second processor computes the first scan operation value by using the changed scan program, and passes the changed scan program to the first processor.

13. The information processing device according to claim 6, wherein when the second processor divides the program into the first and second portions, the second processor inserts an authentication code for performing a prescribed operation into the second portion of the program, and stores a first value obtained by the prescribed operation in the first memory, and when the second processor receives the command destined for the information protection circuit that contains a second value that the first processor computed by performing the prescribed operation in accordance with the authentication code encountered during execution of the second portion of the program, the second processor compares the second value with the first value and, when the second value does not match the first value, sends a signal that directs stopping of the program to the first processor.

14. The information processing device according to claim 13, wherein the information protection circuit further includes a timing circuit which is inaccessible from the first processor but accessible from the second processor and which generates a timing signal, and wherein the second processor measures how much time has elapsed since the second portion of the program has been passed to the first processor based on the timing signal, and when the second processor does not receive the command destined for the information protection circuit that contains the second value within a predefined elapsed time, the second processor sends a signal that directs stopping of the program to the first processor.

15. An information processing device comprising:
a first processor;
an information protection circuit; and
a first communication path which provides a connection between the information protection circuit and the first processor, wherein the information protection circuit includes:

an interface circuit which connects the information protection circuit to the first communication path;

a second processor;

a first memory which is inaccessible from the first processor but accessible from the second processor;

a random number generating circuit which is inaccessible from the first processor but accessible from the second processor and which generates a random number;

an encryption circuit which is inaccessible from the first processor but accessible from the second processor and which performs a prescribed operation on an input value; and a timing circuit which is inaccessible from the first processor but accessible from the second processor and which generates a timing signal, wherein when a command received from the first communication path is a command destined for the information protection circuit, the interface circuit passes the command to the second processor, but when the command received from the first communication path is not a command destined for the information protection circuit, the interface circuit does not pass the command to the second processor, and when the command destined for the information protection circuit is received from the first processor via the first communication path, the second processor executes a process related to information stored in the first memory, wherein the information processing device further comprises a second memory which is accessible by the first processor and which stores encrypted information, and wherein the first memory stores a first value obtained by inputting the encrypted information at a given time in the past into the encryption circuit, and when the second processor receives the command destined for the information protection circuit that contains the encrypted information retrieved from the second memory from the first processor, the second processor obtains a second value by inputting the encrypted information contained in the command into the encryption circuit and, when the second value does not match the first value, sends a signal to the first processor to notify that the encrypted information stored in the second memory is illegally altered.

16. The information processing device according to claim 15, wherein the first memory and the second memory each include a nonvolatile memory, and wherein the nonvolatile memory in the first memory is smaller in terms of capacity than the nonvolatile memory in the second memory.

* * * * *